US007366658B2

(12) United States Patent
Moogi et al.

(10) Patent No.: US 7,366,658 B2
(45) Date of Patent: Apr. 29, 2008

(54) NOISE PRE-PROCESSOR FOR ENHANCED VARIABLE RATE SPEECH CODEC

(75) Inventors: Pratibha Moogi, Karnataka (IN); Chanaveeragouda Virupaxagouda Goudar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/608,963

(22) Filed: Dec. 11, 2006

(65) Prior Publication Data

US 2007/0136056 A1 Jun. 14, 2007

Related U.S. Application Data

(60) Provisional application No. 60/748,737, filed on Dec. 9, 2005.

(51) Int. Cl.

*G10L 21/02* (2006.01)
*G10L 11/06* (2006.01)
*H04B 15/00* (2006.01)

(52) U.S. Cl. ...................... 704/205; 704/208; 704/226; 381/94.3; 381/94.7

(58) Field of Classification Search ................ 704/208, 704/214, 225, 226, 227, 228, 205; 381/94.1, 381/94.2, 94.3, 94.7

See application file for complete search history.

(56) References Cited

U.S. PATENT DOCUMENTS

| | | | | |
|---|---|---|---|---|
| 4,811,404 | A * | 3/1989 | Vilmur et al. | 381/94.3 |
| 5,400,409 | A * | 3/1995 | Linhard | 381/92 |
| 5,544,250 | A * | 8/1996 | Urbanski | 381/94.3 |
| 5,937,377 | A * | 8/1999 | Hardiman et al. | 704/225 |
| 6,289,309 | B1 * | 9/2001 | deVries | 704/233 |
| 6,317,709 | B1 * | 11/2001 | Zack | 704/225 |
| 6,366,880 | B1 * | 4/2002 | Ashley | 704/226 |
| 6,415,253 | B1 * | 7/2002 | Johnson | 704/210 |
| 6,453,291 | B1 * | 9/2002 | Ashley | 704/233 |
| 6,658,380 | B1 * | 12/2003 | Lockwood et al. | 704/215 |
| 7,058,572 | B1 * | 6/2006 | Nemer | 704/226 |
| 2005/0143989 | A1 * | 6/2005 | Jelinek | 704/226 |

* cited by examiner

*Primary Examiner*—Martin Lerner
(74) *Attorney, Agent, or Firm*—Robert D. Marshall, Jr.; W. James Brady; Frederick J. Telecky, Jr.

(57) ABSTRACT

An enhanced noise pre-processor in a speech codec smoothes channel energy estimate moving toward a first smoothing constant if a prior signal to noise ratio estimate for more than five channels are above a threshold and toward a second smaller smoothing constant otherwise. Forming a signal to noise ratio estimate for each channel includes conditionally boosting if a signal energy estimate is more than a predetermined factor of a noise energy estimate and signal to noise ratio estimates are above a threshold for more than five channels. The estimated signal to noise ratio is conditionally modified if two long term prediction coefficients are above a predetermined factor. The estimated signal to noise ratio is not modified and a voice metric is set greater than a voice metric threshold upon matching templates corresponding to the fricative and nasal speech sounds. An adaptive minimum channel gain is chosen based on a current signal to noise ratio estimate.

9 Claims, 3 Drawing Sheets

NOISE PRE-PROCESSOR FOR ENHANCED VARIABLE RATE SPEECH CODEC

CLAIM OF PRIORITY

This application claims priority under 35 U.S.C. 119(e)(1) to U.S. Provisional Application No. 60/748,737 filed Dec. 9, 2005.

TECHNICAL FIELD OF THE INVENTION

The technical field of this invention is voice codecs in wireless telephones.

BACKGROUND OF THE INVENTION

Enhanced Variable Rate Codec (EVRC) is a speech codec used in code division for multiple access (CDMA) wireless telephone systems. EVRC is source controlled variable rate coder where the a frame of speech corresponding to 20 mS of speech can be encoded in any one of full rate (171 bits), half rate (80 bits) and one-eighth rate (16 bits) depending on the speech content. The coder has noise pre-processor (NPP) which suppresses background noise to improve the quality of speech. There is a need in the art to improve the noise pre-processor under noisy conditions to improve the speech quality.

SUMMARY OF THE INVENTION

This invention is improvements in a noise pre-processor used in a speech codec. The method includes: forming a Fast Fourier transform of sampled speech input signals; filtering into a plurality of channels; forming a signal energy estimate for each channel; forming a signal to noise ratio estimate for each channel; forming a voice metric; determining whether to modify the signal to noise ratio estimate; and forming a channel gain for each channel.

Forming the signal energy estimate includes smoothing the energy estimate employing an adaptive smoothing constant α. The smoothing constant α is updated toward a first smoothing constant if a signal to noise ratio estimates in the previous frame are above a threshold value for more than five channels and toward a second lower smoothing constant otherwise.

Forming a signal to noise ratio estimate for each channel includes conditional boosting of the signal to noise ratio estimate. If the current signal energy estimate in a given channel is more than a predetermined factor of a noise energy estimate and a signal to noise ratio estimates in the previous frame are greater than a threshold value for more than five channels, then the channel's signal to noise ratio is a weighted sum of a current signal to noise ratio estimate with the previous frame signal to noise ratio estimate using a gain of 1.25. Otherwise it is unchanged. If the signal energy estimate is less than the predetermined factor of the noise energy estimate, then the signal to noise ratio estimate is averaged over the previous frame without any gain.

Deciding whether to modify the signal to noise estimates by resetting them to a predetermined value includes two long term prediction estimates.

Forming the voice metric for each channel includes comparing a pattern of signal to noise estimates for the plural channels to two templates corresponding to fricative and nasal speech sounds. If there is a match, the voice metric is set greater than a voice metric threshold and a signal to noise ratio modification flag is set to FALSE.

Forming gain factors includes a use of adaptive value of a minimum gain in the gain computation as opposed to the fixed minimum gain used in the prior art.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
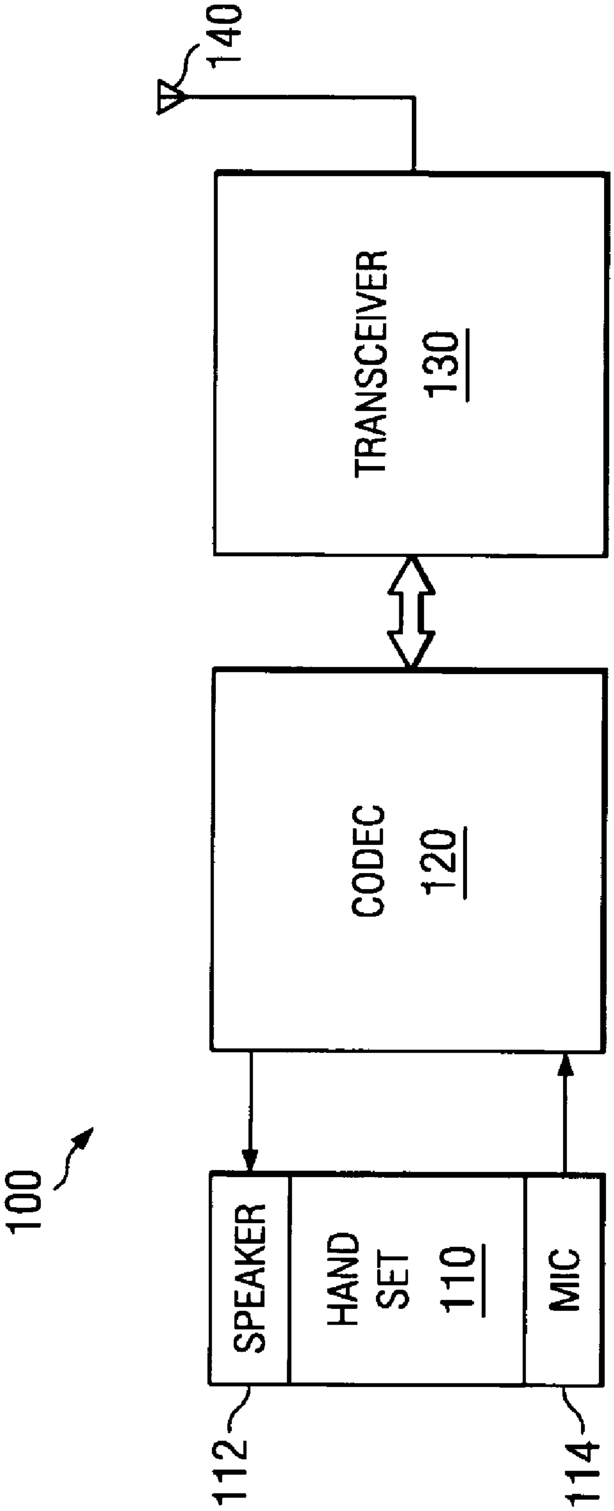
FIG. 1 (PRIOR ART)
FIG. 1 is a block diagram of a prior art wireless telephone to which this invention is applicable.

FIG. 1 illustrates an example prior art wireless telephone 100 to which this invention is applicable. Wireless telephone includes handset 110 having speaker 112 and microphone 114. It is typical for handset 110 to be constructed so that positioning speaker 112 at the user's ear for use automatically places microphone 114 in position to capture speech generated by the user. It is also typical for the major electronic components of wireless telephone 100 to be placed within the same housing as headset 110 intermediate between speaker 112 and microphone 114.

Handset 110 is bidirectionally coupled to coder/decoder (codec) 120. Specifically, speaker 112 receives electrical speech signals from codec 120 for reproduction into speech and microphone 114 coverts received speech sounds into electrical speech signals supplied to codec 120. Codec 120 codes the electrical speech signals from microphone 114 into signals that can be wirelessly transmitted via transceiver 130. Codec 120 receives coded signals from transceiver 130 and decodes them into electrical speech signals that can be reproduced by speaker 112.

Transceiver 130 is bidirectionally coupled to codec 120 as previously described. Transceiver 130 transmits coded speech signals from codec 120 as radio waves via antenna 140. Transceiver 130 receives radio waves via antenna 140 and supplies corresponding coded speech signals to codec 120.

Figure 2:
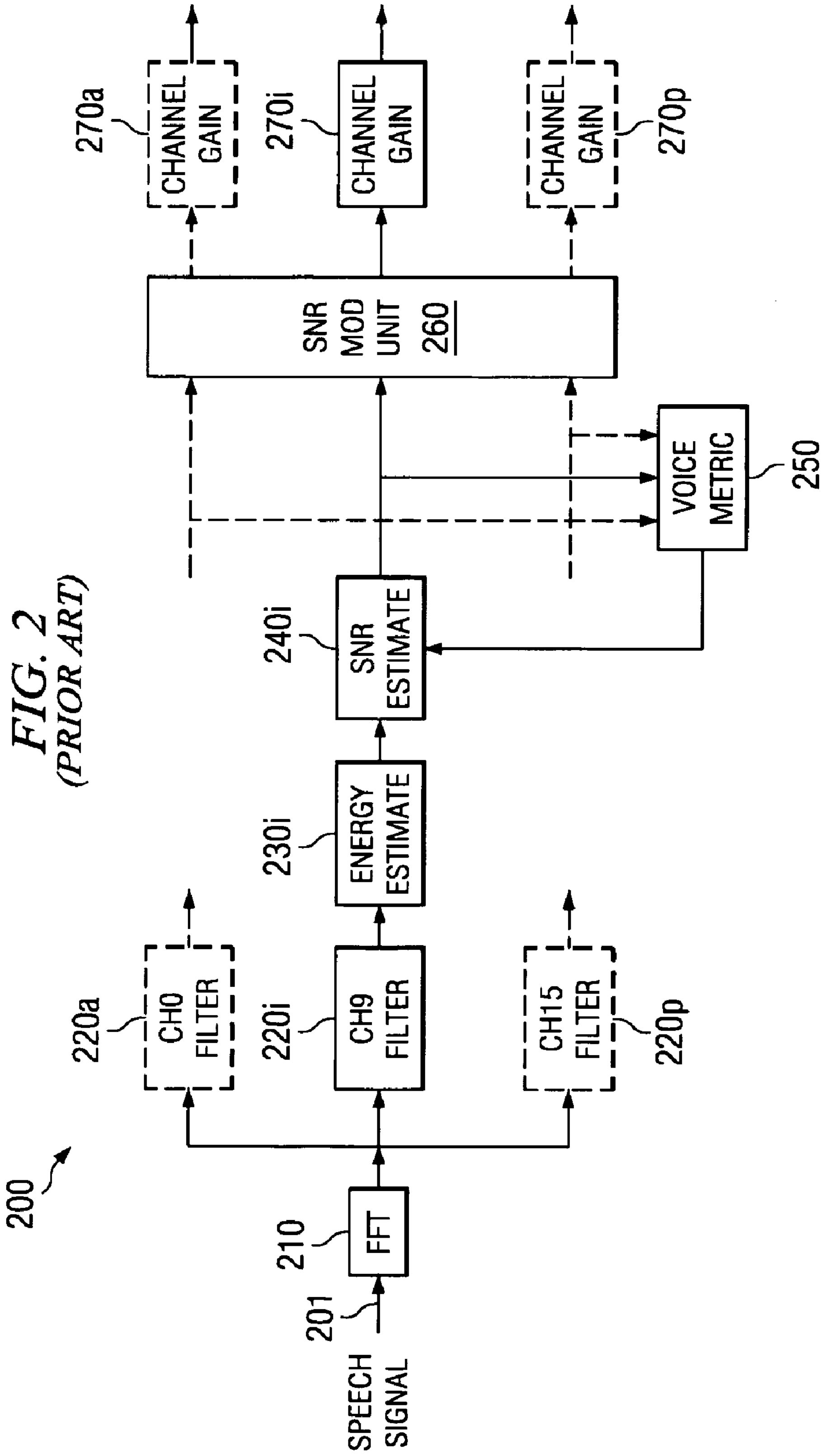
FIG. 2 (PRIOR ART)
FIG. 2 is a block diagram of a typical prior art noise pre-processor.

FIG. 2 illustrates a noise pre-processor (NPP) 200 according to the prior art. In this prior art system the speech signal is sampled at 8 KHz providing 20 mS speech signal frames. Noise pre-processor (NPP) 200 is applied prior to encoding the speech frames. NPP 200 operates on every 10 mS of speech segments.

The input speech signal 201 is subject to a Fast Fourier Transform in FFT unit 210. The frequency domain data from FFT unit 210 is divided into 16 channels spanning frequencies from 125 Hz to 4000 Hz in filters **220*a* to 220*p*. These channels are adjacent and span the speech frequency range. The following processing is generally on a per-channel basis. FIG. 2 illustrates exemplary channel 9** designated i. The remaining channels are similarly constructed.

Channel energy estimate units **230*a* to 230*p* sum the energy in the corresponding frequency bin. Channel energy estimate units 230*a* to 230*p*** also time smoothes these energy estimates for the corresponding frequency bins. The energy smoothing combines the previous frame's smoothed channel energy estimate with the energy estimate of the current frame as follows:

$$SE_{Chi,n}=\alpha^{*}E_{Chi,n}+(1-\alpha)SE_{Chi,n-1} \quad (1)$$

where: $SE_{Chi,n}$ is the smoothed energy estimate for channel i at time n; $E_{Chi,n}$ is the current energy estimate for channel i at time n; and α is a smoothing constant equal to 0.55. Channel energy estimate units 230_a_ to 230_p_ further clamp the minimum smoothed energy estimate to MIN_CHAN_ENGR as follows:

$$SE_{Chi,n}=\begin{cases}\text{if} & SE_{Chi,n}<\text{MIN\_CHAN\_ENGR}, \\ & \text{MIN\_CHAN\_ENGR} \\ \text{else} & SE_{Chi,n}\end{cases} \quad (2)$$

Signal to noise estimators 240_a_ to 240_p_ compute respective channel estimated signal to noise ratios based on the channel signal $SE_{chi,n}$ and the channel noise energy estimate $NE_{Chi,n}$. A preliminary signal to noise ratio $PSNR_{Chi,n}$ is set to zero if negative. This clamped $PSNR_{Chi,n}$ is divided by a factor of 0.375 factor and added to a floor of 0.1875/0.375 as follows:

$$PSNR_{Chi,n}=\begin{cases}\text{if} & PSNR_{Chi,n}<0, \\ & 0 \\ \text{else} & PSNR_{Chi,n}\end{cases} \quad (3)$$

$$SNR_{Chi,n}=PSNR_{Chi,n}/0.375+0.1875/0.375 \quad (4)$$

where: $PSNR_{Chi,n}$ is the preliminary signal to noise ratio for channel i at time n; and $SNR_{Chi,n}$ is the estimated channel signal to noise ratio for channel i at time n.

Voice metric unit 250 computes a value of a voice metric (vm_sum) from the estimated signal to noise ratio of all channels. The value of vm_sum is computed every 10 ms as follows:

$$\text{vm\_sum}=\sum_{all\ i}\text{vm\_table}(\text{ch\_snr}[i]) \quad (5)$$

where: vm_sum is the voice metric to be computed; vm_table is a look-up table yielding a number for each signal to noise ratio input; and ch_snr[i] is the channel signal to noise ratio estimate for channel i $SNR_{Chi,n}$. Depending on the value of the voice metric vm_sum, signal to noise estimator 240_i_ optionally updates the channel noise energy estimate $NE_{Chi,n}$.

SNR modification unit 260 determines whether the channel SNR estimates are modified. For each channel the channel SNR estimate is compared with a threshold INDEX_THLD. This value INDEX_THLD is typically 12. If for the sixth to the sixteenth channels the SNR estimates are less than INDEX_THLD for more than 5 channels, the SNR estimates are conditionally modified or reset to 1. In SNR modification unit 260 a signal to noise ratio modify_flag is set TRUE when channel SNR estimates for fewer than five channels ranging between the sixth channel to the sixteenth channel are above 12, else modify_flag is FALSE.

$$\text{modify\_flag}=\begin{cases}\text{if} & \text{index\_cnt}<\text{INDEX\_CNT\_THLD} \\ & \text{TRUE} \\ \text{else} & \text{FALSE}\end{cases} \quad (6)$$

where: index_cnt is the count of channels where the SNR estimate is below INDEX_THLD, which is 12 in this example; INDEX_CNT_THLD is the index count threshold, which is 5 in this example. If SNR modification unit 260 determines the SNR estimates are to be modified, they are reset to 1 dB, subject to the condition that vm_sum is less than a voice metric threshold. This will be further detailed below.

Channel gain units 270_a_ to 270_p_ calculate a gain for the corresponding channel based upon the corresponding optionally modified SNR estimate. The prior art noise pre-processor 200 uses a fixed minimum gain value MIN_GAIN of −13 dB.

Figure 3:
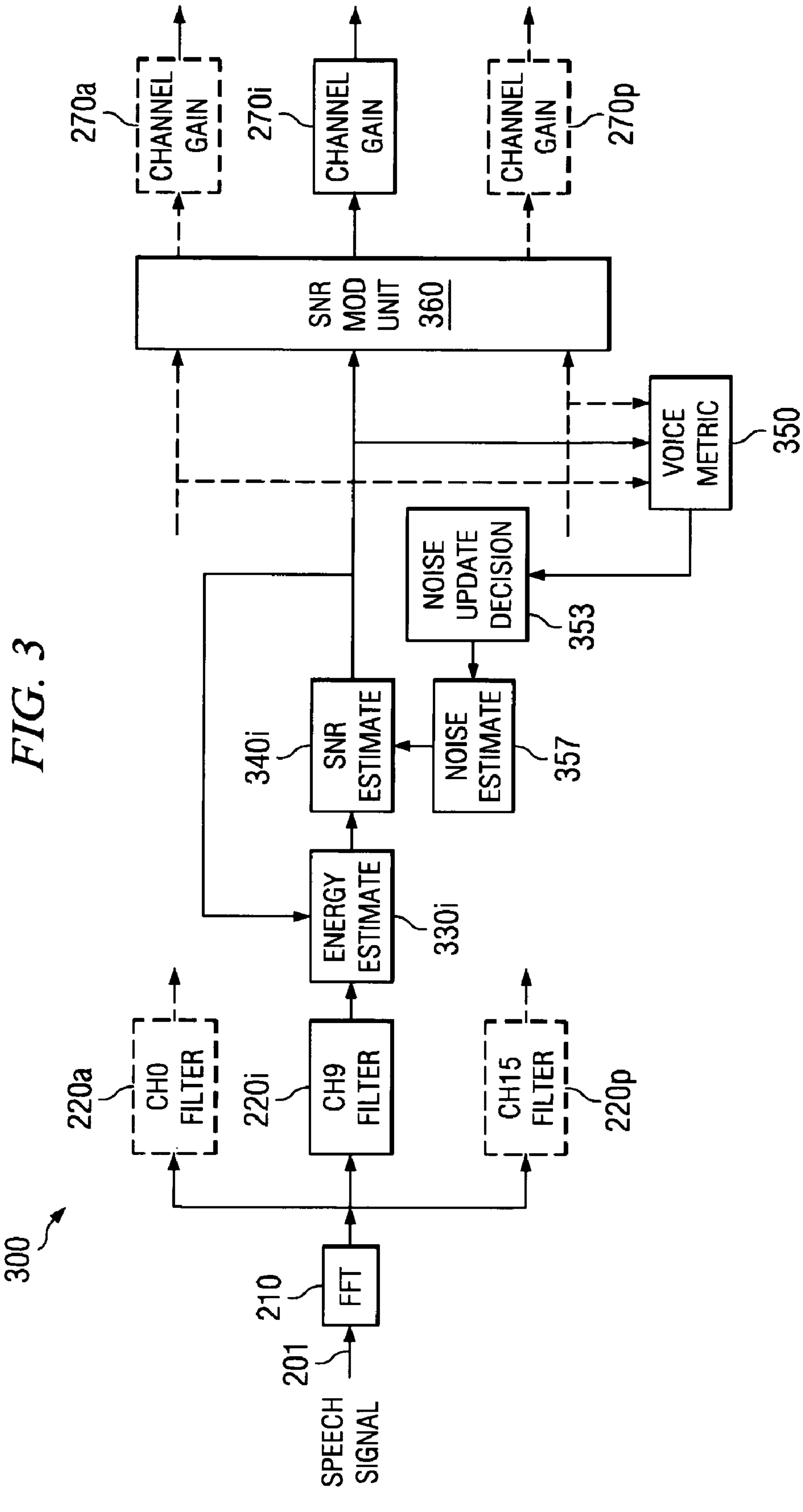
FIG. 3 is a block diagram of the noise pre-processor of this invention.

FIG. 3 illustrates a noise pre-processor (NPP) 300 according to this invention. Parts that are the same as prior art noise pre-preprocessor 200 are given the same reference numbers. Differing parts are given corresponding numbers in the 300s. Noise pre-processor (NPP) 300 subjects input speech signal 201 to a Fast Fourier Transform in FFT unit 210. Filters 220_a_ to 220_p_ divide the frequency domain data from FFT unit 210 into 16 channels.

Channel energy estimate units 330_a_ to 330_p_ sum the energy in the corresponding frequency bin. Channel energy estimate units 330_a_ to 330_p_ also provide time smoothed energy estimates for the corresponding frequency bins. A fixed value of 0.55 for the updating constant α of the prior art subjectively introduces buzziness in the speech quality particularly noticeable in the speech transition regions and non-stationary regions. This invention uses an adaptive smoothing constant α. If the previous frame's SNR estimates are greater than 10 dB for more than five channels, then α is updated towards a value of 0.80. This change in α is based on the fact that the prior detected signal energy is sufficiently higher than background noise and thus should contribute less to the signal portion of the SNR estimate. This provides less averaging with the past value of smoothed channel energy if the frame is likely to be active speech frame and provides a more accurate estimate of the instantaneous signal energy for that time frame. Otherwise, when the previous frame's SNR estimate is more than 10 dB for less than or equal to five channels, then α is updated toward a value of 0.55 used in the prior art. This supplies a greater contribution from past speech frames which are likely to be noise-only frames. Thus the smoothed signal to noise estimate is computed as follows:

$$\begin{aligned}&\text{If count>threshold count1 then } \alpha=0.25^{*}\alpha+0.75^{*}\alpha1\\&\quad\text{else } \alpha=0.25^{*}\alpha+0.75^{*}\alpha2\end{aligned} \quad (7)$$

$$SE_{Chi,n}=\alpha^{*}E_{Chi,n}+(1-\alpha)SE_{Chi,n-1} \quad (8)$$

where: count is the number of channels for which the signal to noise ratio estimate for the previous frame is greater than 10 dB; threshold count1 is a predetermined constant which is 5 in this example; α is an adaptive smoothing constant; α1 is a first smoothing constant, in this example 0.80; α2 is a second smoothing constant, in this example 0.55; $SE_{Chi,n}$ is the smoothed energy estimate for channel i at time n; and $E_{Chi,n}$ is the current energy estimate for channel i at time n.

Thus the smoothing constant α moves asymptotically toward 0.80 if the count exceeds threshold count and moves asymptotically toward 0.55 if not.

Noise pre-processor 300 differs from noise pre-processor 200 in the SNR estimators 340*a* to 340*p*. The SNR estimates of SNR estimators 240*a* to 240*p* were noisy. This noise was especially evident in the speech ONSET and OFFSET regions where fricatives, nasals or stop-consonants are most likely. The weak speech signal in such frames causes the SNR estimates to be low. This resulted in unwanted suppression of these frames via the channel gain output. This frame suppression causes deterioration of speech quality. SNR estimators 340*a* to 340*p* employ a running conditional averaging of SNR estimates with applying conditionally a gain to boost the SNR estimates. This conditional smoothing 340*a* to 340*p* causes SNR estimates to be a highly smoothed version of SNR of current and the past frame if SNR of the current frame is found to be below a threshold value (same as when signal energy after noise suppression is more than twice as strong as the noise energy i.e. a posteriori SNR of about 4.77 dB). Otherwise it follows the current frame's SNR estimate but except for the condition where more than five channels show SNR greater than 10 dB for the current frame. For this particular case, band SNR estimates are scaled up with a gain factor of 1.25. The highly smoothed version of SNR estimate for the conditions when noise level is relatively high helps reduce the musical noise effect. Conditional boosting of SNR estimates helps speech transition regions not to be suppressed. This is shown as follows:

$$PSNR_{Chi,n} = \begin{cases} \text{if } (SE_{Chi,n} - NE_{Chi,n}) > 2 * NE_{Chi,n}, \\ \quad \text{if (count > threshold count2)} \\ \quad\quad 1.0 * PSNR_{Chi,n} + 0.25 * PSNR_{Chi,n-1} \\ \quad \text{else} \\ \quad\quad PSNR_{Chi,n} \\ \text{else } 0.6 * PSNR_{Chi,n} + 0.4 * PSNR_{Chi,n-1} \end{cases} \quad (9)$$

where: threshold count2 is a predetermined constant which is 5 in this example; $SE_{Chi,n}$ is the smoothed signal energy for channel i at time n; $NE_{Chi,n}$ is the noise energy for channel i at time n; $PSNR_{Chi,n}$ is the preliminary signal to noise ratio for channel i at time n; count is the number of channels for which the posterior signal to noise ratio estimate for the previous frame is greater than 10 dB; and $SNR_{Chi,n}$ is the estimated channel signal to noise ratio for channel i at time n as derived in equations (3) and (4). This modification of the SNR smoothing protects speech transition regions from being suppressed and results in better speech quality.

Voice metric unit 350 computes vm_sum based on the channel SNR estimates at every 10 ms. This metric plays a crucial role in making a decision to update noise band energies in SNR estimators 340*a* to 340*p*. For the speech regions where speech signal energy is relatively weak, such as low energy fricatives, nasals and vowels such as schwas, voice metric unit 250 computes a value of vm_sum that is generally low, below a threshold value METRIC_THLD. Such a low value of vm sum causes the SNR estimates to reset to 1 dB in SNR modification unit 250 and wrongly updates the noise energies. This invention uses the following solution to mitigate this problem. Voice metric unit 350 employs two SNR templates which are trained on two broad categories of speech sounds fricatives and nasals. Voice metric unit 350 compares the current SNR estimate pattern across the channels with these two templates every 10 ms frame. Noise update decision unit 353 determines if the correlation between either template and the current SNR estimate pattern across the channels exceeds 0.6. If this is found, then noise estimator 357 causes vm_sum to be set to METRIC_THLD+1. This prevents setting the channel SNR estimate to 1 dB in SNR modification unit 360 if the vm_sum≦METRIC_THLD condition is true.

SNR modification unit 360 uses two estimates of long term prediction coefficient from previous frame (β, β1) to make a decision to whether further conditionally modify the SNR estimates. The state variable modify_flag, which controls the SNR estimate modification, is determined as follows:

$$\text{modify\_flag} = \begin{cases} \text{if} & \text{(index\_cnt < INDEX\_CNT\_THLD) OR} \\ & (\beta < 0.3 \text{ AND } \beta1 < 0.3) \\ & \text{TRUE} \\ \text{else} & \text{FALSE} \end{cases} \quad (10)$$

where: index_cnt is the count of channels where the SNR estimate is below INDEX_THLD, which is 12 is this example; INDEX_CNT_THLD is the index count threshold, which is 5 in this example; and β and β1 are two long term prediction coefficients estimated from a previous frame. As in the case of channel gain units 270*a* to 270*p* if modification is determined, the SNR estimates are conditionally reset to 1 dB.

Channel gain units 370*a* to 370*p* use an adaptive scheme to choose MIN_GAIN factor between −13 dB and −16 dB depending on SNR estimates of channels. This leads to a significant reduction in audible background noise. The MIN_ GAIN is changed linearly between −16 dB to −13 dB for channel SNR estimates between 6 dB and 40 dB. The MIN_GAIN is set to −13 dB for channel SNR estimates greater than 40 dB.

The above enhancements of the noise pre-processor achieve a significant gain of between 0.03 and 0.20 in Mean Opinion Score (MOS), a subjective quality score, in noisy background conditions while maintaining same quality in the clean conditions. This improvement is validated by a listening test laboratory and subjective listening tests. PESQ, another objective speech quality measure based on the P.862 standard of ITU, also shows significant improvements with an average gain of between 0.046 and 0.078 per noisy condition. The enhanced noise pre-processor of this invention requires less than 10% additional complexity compared to the prior art.

What is claimed is:

1. A method of pre-processing speech input signals for noise comprising the steps of:

forming a Fast Fourier transform of sampled speech input signals transforming said sampled speech input signals from time domain to frequency domain;

filtering said frequency domain data into a plurality of adjacent frequency channels spanning a range of frequencies of human speech;

forming an energy estimate for each channel;

smoothing said energy estimate for each channel by weighted summing of a current energy estimate for said channel and a prior smoothed energy estimate for said channel as follows $$SE_{Chi,n} = \alpha * E_{Chi,n} + (1-\alpha) SE_{Chi,n-1}$$

where: $SE_{Chi,n}$ is the smoothed energy estimate for channel i at time n; $E_{Chi,n}$ is the current energy estimate for channel i at time n; and α is an adaptive smoothing constant;

forming a signal to noise ratio estimate for said channel dependent upon a corresponding smoothed energy estimate;

forming a voice metric for each channel dependent upon a corresponding signal to noise ratio estimate; and forming a channel gain for each channel dependent upon a corresponding voice metric;

wherein said smoothing said energy estimate for each channel moves said adaptive smoothing constant toward a first smoothing constant if said prior signal to noise ratio estimate for more than a predetermined number of channels is above a signal to noise ratio threshold and moves said adaptive smoothing constant toward a second smoothing constant less than or equal to said first smoothing constant if said prior signal to noise ratio estimate for less than said predetermined number of channels is above said signal to noise ratio threshold, and said adaptive smoothing constant is determined as follows: if said prior signal to noise ratio estimate for more than said predetermined number of channels is above said signal to noise ratio threshold then $$\alpha=0.25*\alpha+0.75*\alpha1$$

else $$\alpha=0.25*\alpha+0.75*\alpha2$$

where: α is said adaptive smoothing constant; α1 is said first smoothing constant; and α2 is said second smoothing constant.

2. The method of claim 1, wherein:

said first smoothing constant is 0.80; and said second smoothing constant is 0.55.

3. A method of pre-processing speech input signals for noise comprising the steps of:

forming a Fast Fourier transform of sampled speech input signals transforming said sampled speech input signals from time domain to frequency domain;

filtering said frequency domain data into a plurality of adjacent frequency channels spanning a range of frequencies of human speech;

forming an energy estimate for each channel;

smoothing said energy estimate for each channel by weighted summing of a current energy estimate for said channel and a prior smoothed energy estimate for said channel as follows $$SE_{Chi,n}=\alpha*E_{Chi,n}+(1-\alpha)SE_{Chi,n-1}$$

where: $SE_{Chi,n}$ is the smoothed energy estimate for channel i at time n; $E_{Chi,n}$ is the current energy estimate for channel i at time n; and α is an adaptive smoothing constant;

forming a signal to noise ratio estimate for said channel dependent upon a corresponding smoothed energy estimate including conditionally boosting said signal to noise ratio estimate dependent upon whether a signal energy estimate is more than a predetermined factor of a noise energy estimate;

forming a voice metric for each channel dependent upon a corresponding signal to noise ratio estimate; and forming a channel gain for each channel dependent upon a corresponding voice metric;

wherein said smoothing said energy estimate for each channel moves said adaptive smoothing constant toward a first smoothing constant if said prior signal to noise ratio estimate for more than a predetermined number of channels is above a signal to noise ratio threshold and moves said adaptive smoothing constant toward a second smoothing constant less than or equal to said first smoothing constant if said prior signal to noise ratio estimate for less than said predetermined number of channels is above said signal to noise ratio threshold.

4. The method of claim 3, wherein:

said predetermined factor of signal energy estimate to noise energy estimate is 2.

5. The method of claim 3, wherein:

said step of forming a signal to noise ratio estimate for said channel sets said signal to noise ratio as follows: if said signal energy estimate is more than a predetermined factor of a noise energy estimate then $$SNR_{Chi,n}=1.0*PSNR_{Chi,n}+0.25*PSNR_{Chi,n-1}$$

else $$SNR_{Chi,n}=0.6*PSNR_{Chi,n}+0.4*PSNR_{Chi,n-1}$$

where: $SNR_{Chi,n}$ is the estimated signal to noise ratio for channel i at time n; and $PSNR_{Chi,n}$ is the preliminary signal to noise ratio for channel i at time n.

6. A method of pre-processing speech input signals for noise comprising the steps of:

forming a Fast Fourier transform of sampled speech input signals transforming said sampled speech input signals from time domain to frequency domain;

filtering said frequency domain data into a plurality of adjacent frequency channels spanning a range of frequencies of human speech;

forming an energy estimate for each channel;

smoothing said energy estimate for each channel by weighted summing of a current energy estimate for said channel and a prior smoothed energy estimate for said channel as follows $$SE_{Chi,n}=\alpha*E_{Chi,n}+(1-\alpha)SE_{Chi,n-1}$$

where: $SE_{Chi,n}$ is the smoothed energy estimate for channel i at time n; $E_{Chi,n}$ is the current energy estimate for channel i at time n; and α is an adaptive smoothing constant;

forming a signal to noise ratio estimate for said channel dependent upon a corresponding smoothed energy estimate;

forming a voice metric for each channel dependent upon a corresponding signal to noise ratio estimate including comparing a pattern of signal to noise estimates for the plural channels to templates corresponding to fricative and nasal speech sounds and forming the voice metric greater than a voice metric threshold if a predetermined degree of match is determined; and forming a channel gain for each channel dependent upon a corresponding voice metric;

wherein said smoothing said energy estimate for each channel moves said adaptive smoothing constant toward a first smoothing constant if said prior signal to noise ratio estimate for more than a predetermined number of channels is above a signal to noise ratio threshold and moves said adaptive smoothing constant toward a second smoothing constant less than or equal to said first smoothing constant if said prior signal to noise ratio estimate for less than said predetermined number of channels is above said signal to noise ratio threshold;

said method further comprises modifying said signal to noise estimates for each channel if more than a predetermined number of voice metrics are below said voice metric threshold and not modifying said signal to noise estimates for each channel if a predetermined degree of match of said pattern of signal to noise estimates for the plural channels to said templates corresponding to fricative and nasal speech sounds is determined.

7. A method of pre-processing speech input signals for noise comprising the steps of:

forming a Fast Fourier transform of sampled speech input signals transforming said sampled speech input signals from time domain to frequency domain;

filtering said frequency domain data into a plurality of adjacent frequency channels spanning a range of frequencies of human speech;

forming an energy estimate for each channel;

smoothing said energy estimate for each channel by weighted summing of a current energy estimate for said channel and a prior smoothed energy estimate for said channel as follows $$SE_{Chi,n}=\alpha*E_{Chi,n}+(1-\alpha)SE_{Chi,n-1}$$

where: $SE_{Chi,n}$ is the smoothed energy estimate for channel i at time n; $E_{Chi,n}$ is the current energy estimate for channel i at time n; and $\alpha$ is an adaptive smoothing constant;

forming a signal to noise ratio estimate for said channel dependent upon a corresponding smoothed energy estimate;

forming a voice metric for each channel dependent upon a corresponding signal to noise ratio estimate; and forming a channel gain for each channel dependent upon a corresponding voice metric including moving an adaptive minimum channel gain linearly varies between a first minimum channel gain and a second minimum channel gain;

wherein said smoothing said energy estimate for each channel moves said adaptive smoothing constant toward a first smoothing constant if said prior signal to noise ratio estimate for more than a predetermined number of channels is above a signal to noise ratio threshold and moves said adaptive smoothing constant toward a second smoothing constant less than or equal to said first smoothing constant if said prior signal to noise ratio estimate for less than said predetermined number of channels is above said signal to noise ratio threshold.

8. The method of claim 7, wherein:

said first minimum channel gain is −13 dB; and said second minimum channel gain is −16 dB.

9. A method of pre-processing speech input signals for noise comprising the steps of:

forming a Fast Fourier transform of sampled speech input signals transforming said sampled speech input signals from time domain to frequency domain;

filtering said frequency domain data into a plurality of adjacent frequency channels spanning a range of frequencies of human speech;

forming an energy estimate for each channel;

smoothing said energy estimate for each channel by weighted summing of a current energy estimate for said channel and a prior smoothed energy estimate for said channel as follows $$SE_{Chi,n}=\alpha*E_{Chi,n}+(1-\alpha)SE_{Chi,n-1}$$

where: $SE_{Chi,n}$ is the smoothed energy estimate for channel i at time n; $E_{Chi,n}$ is the current energy estimate for channel i at time n; and $\alpha$ is an adaptive smoothing constant;

forming a signal to noise ratio estimate for said channel dependent upon a corresponding smoothed energy estimate;

modifying said signal to noise ratio estimate for each channel by resetting said signal to noise ratio estimates to 1 dB if said signal to noise ratio estimate for less than a predetermined number of channels is above a signal to noise ratio threshold or both of two long term prediction coefficients from a previous frame are below a threshold;

forming a voice metric for each channel dependent upon a corresponding signal to noise ratio estimate; and forming a channel gain for each channel dependent upon a corresponding voice metric;

wherein said smoothing said energy estimate for each channel moves said adaptive smoothing constant toward a first smoothing constant if said prior signal to noise ratio estimate for more than a predetermined number of channels is above a signal to noise ratio threshold and moves said adaptive smoothing constant toward a second smoothing constant less than or equal to said first smoothing constant if said prior signal to noise ratio estimate for less than said predetermined number of channels is above said signal to noise ratio threshold.

* * * * *